(12) United States Patent
 Gu

(10) Patent No.: US 9,532,631 B2
(45) Date of Patent: Jan. 3, 2017

(54) HINGED COVER FOR COMPUTING DEVICE

(71) Applicant: Microsoft Technology Licensing, LLC, Redmond, WA (US)

(72) Inventor: Jiawei Gu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 107 days.

(21) Appl. No.: 14/517,332

(22) Filed: Oct. 17, 2014

(65) Prior Publication Data

US 2015/0293564 A1  Oct. 15, 2015

(30) Foreign Application Priority Data

Apr. 9, 2014  (WO) ................ PCT/CN2014/074988

(51) Int. Cl.
 *G06F 1/16* (2006.01)
 *A45C 11/00* (2006.01)
 *A45C 13/00* (2006.01)

(52) U.S. Cl.
 CPC ............. *A45C 11/00* (2013.01); *A45C 13/005* (2013.01); *G06F 1/1626* (2013.01); *A45C 2011/003* (2013.01); *A45C 2200/15* (2013.01); *G06F 2200/1633* (2013.01); *G06F 2200/1634* (2013.01)

(58) Field of Classification Search
 CPC .................................................. G06F 1/1681
 See application file for complete search history.

(56) References Cited

U.S. PATENT DOCUMENTS

| 5,168,426 | A | 12/1992 | Hoving et al. |
| 5,943,041 | A | 8/1999 | Allison et al. |
| 6,727,894 | B1 | 4/2004 | Karidis |
| 6,798,649 | B1 | 9/2004 | Olodort |

(Continued)

FOREIGN PATENT DOCUMENTS

| CN | 1650250 | 8/2005 |
| CN | 101316401 | 12/2008 |

(Continued)

OTHER PUBLICATIONS

"International Search Report and Written Opinion", Application No. PCT/CN2014/074788, Dec. 30, 2014, 12 pages.

(Continued)

*Primary Examiner* — Lisa Lea Edmonds
(74) *Attorney, Agent, or Firm* — Sandy Swain; Micky Minhas

(57) ABSTRACT

Techniques including use of a hinged cover for a computing device are described. In one or more implementation, a system includes a computing device having a slate form factor and an input device. The input device has a cover configured to assume a closed configuration in which first and second cover portions of the cover at least partially cover a display device of the computing device and an open configuration in which the display device and input functionality usable to initiate one or more operations of the computing device are exposed. The input device also has a hinge mechanism configured such that when the cover is in the open configuration the first and second members form a support structure, at a rear of the computing device that opposes a side of the computing device having the display device.

20 Claims, 8 Drawing Sheets

(56) References Cited

U.S. PATENT DOCUMENTS

| | | | |
|---|---|---|---|
| 6,975,507 B2 | 12/2005 | Wang et al. | |
| 7,025,274 B2 | 4/2006 | Solomon et al. | |
| 7,054,441 B2 | 5/2006 | Pletikosa | |
| 8,050,030 B2 | 11/2011 | Wu et al. | |
| 8,077,151 B2* | 12/2011 | Morooka | G06F 1/1613 345/156 |
| 8,138,869 B1* | 3/2012 | Lauder | G06F 1/1613 24/303 |
| 8,498,100 B1 | 7/2013 | Whitt, III et al. | |
| 8,749,960 B2* | 6/2014 | Mori | H05K 5/0086 248/346.03 |
| 8,766,921 B2 | 7/2014 | Ballagas et al. | |
| 8,811,008 B2 | 8/2014 | Selkirk et al. | |
| 8,812,029 B1 | 8/2014 | Cao et al. | |
| 8,839,953 B2 | 9/2014 | Igarashi | |
| 8,875,879 B2 | 11/2014 | Diebel et al. | |
| 8,922,982 B1 | 12/2014 | Chen | |
| 8,988,876 B2* | 3/2015 | Corbin | A45C 13/002 361/679.58 |
| 9,013,863 B2 | 4/2015 | Hsu | |
| 9,078,338 B2* | 7/2015 | Ohtaka | H05K 7/00 |
| 9,082,407 B1 | 7/2015 | Faaborg et al. | |
| 9,131,756 B2* | 9/2015 | Hurst | A45C 13/1069 |
| 9,189,019 B2* | 11/2015 | Jenkins | G06F 1/1616 |
| 9,280,181 B2* | 3/2016 | Tomita | G06F 1/1637 |
| 9,304,549 B2 | 4/2016 | Siddiqui | |
| 9,324,234 B2 | 4/2016 | Ricci et al. | |
| 9,411,436 B2 | 8/2016 | Shaw et al. | |
| 9,451,822 B2 | 9/2016 | Gu | |
| 2003/0019996 A1 | 1/2003 | Shields | |
| 2003/0146902 A1 | 8/2003 | Sandbach et al. | |
| 2004/0114315 A1 | 6/2004 | Anlauff | |
| 2004/0212954 A1 | 10/2004 | Ulla et al. | |
| 2004/0246666 A1 | 12/2004 | Maskatia et al. | |
| 2005/0002158 A1 | 1/2005 | Olodort | |
| 2005/0052831 A1 | 3/2005 | Chen | |
| 2005/0168925 A1 | 8/2005 | Fang et al. | |
| 2005/0258021 A1 | 11/2005 | Liu et al. | |
| 2006/0007645 A1* | 1/2006 | Chen | G06F 1/1626 361/679.04 |
| 2007/0021012 A1 | 1/2007 | Ogawa et al. | |
| 2007/0030634 A1 | 2/2007 | Maskatia | |
| 2008/0024436 A1 | 1/2008 | Morooka | |
| 2009/0159763 A1 | 6/2009 | Kim | |
| 2009/0283654 A1 | 11/2009 | Hu | |
| 2010/0122924 A1* | 5/2010 | Andrews | A45C 9/00 206/320 |
| 2011/0050063 A1 | 3/2011 | Wang et al. | |
| 2011/0290687 A1* | 12/2011 | Han | A45C 3/02 206/320 |
| 2011/0297564 A1 | 12/2011 | Kim et al. | |
| 2011/0297566 A1 | 12/2011 | Gallagher et al. | |
| 2012/0009000 A1 | 1/2012 | Starrett | |
| 2012/0012483 A1* | 1/2012 | Fan | F16M 11/10 206/320 |
| 2012/0037285 A1 | 2/2012 | Diebel et al. | |
| 2012/0037523 A1* | 2/2012 | Diebel | A45C 11/00 206/320 |
| 2012/0057288 A1 | 3/2012 | Chou et al. | |
| 2012/0125791 A1 | 5/2012 | Parker et al. | |
| 2012/0194448 A1 | 8/2012 | Rothkopf | |
| 2012/0211377 A1* | 8/2012 | Sajid | G06F 1/1628 206/216 |
| 2012/0243163 A1 | 9/2012 | Kim | |
| 2012/0293953 A1* | 11/2012 | Wu | F16M 11/10 361/679.56 |
| 2012/0300383 A1* | 11/2012 | Lauder | G06F 1/1647 361/679.26 |
| 2012/0314342 A1 | 12/2012 | Sheu et al. | |
| 2012/0327580 A1 | 12/2012 | Gengler | |
| 2013/0083953 A1 | 4/2013 | Chang | |
| 2013/0088431 A1 | 4/2013 | Ballagas et al. | |
| 2013/0114198 A1 | 5/2013 | Gengler | |
| 2013/0134061 A1* | 5/2013 | Wu | G06F 1/1626 206/320 |
| 2013/0175200 A1* | 7/2013 | Poon | F16M 13/00 206/759 |
| 2013/0220043 A1 | 8/2013 | Hsu et al. | |
| 2013/0229356 A1 | 9/2013 | Marwah et al. | |
| 2013/0235521 A1 | 9/2013 | Burch et al. | |
| 2013/0242490 A1* | 9/2013 | Ku | G06F 1/1628 361/679.3 |
| 2013/0270980 A1 | 10/2013 | Hsu | |
| 2013/0277271 A1 | 10/2013 | Toulotte | |
| 2013/0329375 A1 | 12/2013 | Chiang et al. | |
| 2014/0029189 A1 | 1/2014 | Chang et al. | |
| 2014/0035820 A1 | 2/2014 | Zheng | |
| 2014/0055937 A1 | 2/2014 | Wang | |
| 2014/0083883 A1* | 3/2014 | Elias | G06F 1/1626 206/320 |
| 2014/0185845 A1 | 7/2014 | Udesen | |
| 2014/0211393 A1 | 7/2014 | Lee | |
| 2014/0218855 A1 | 8/2014 | Fujino | |
| 2014/0254079 A1 | 9/2014 | Yang | |
| 2014/0262854 A1 | 9/2014 | Chen et al. | |
| 2014/0298062 A1 | 10/2014 | Lee | |
| 2014/0311880 A1 | 10/2014 | Krumpelman et al. | |
| 2014/0332418 A1 | 11/2014 | Cheung et al. | |
| 2015/0001105 A1 | 1/2015 | Nyholm et al. | |
| 2015/0027603 A1 | 1/2015 | Mogol | |
| 2015/0055284 A1 | 2/2015 | Han | |
| 2015/0122850 A1* | 5/2015 | Quehl | A45C 11/00 224/191 |
| 2015/0280768 A1* | 10/2015 | Huang | H04B 1/3888 455/575.8 |
| 2015/0293601 A1 | 10/2015 | Gu | |
| 2015/0293606 A1 | 10/2015 | Gu | |
| 2015/0296060 A1 | 10/2015 | Gu | |
| 2016/0027399 A1 | 1/2016 | Wilde et al. | |
| 2016/0179253 A1 | 6/2016 | Franklin et al. | |
| 2016/0259427 A1 | 9/2016 | Zheng et al. | |
| 2016/0277562 A1 | 9/2016 | Chen et al. | |

FOREIGN PATENT DOCUMENTS

| | | |
|---|---|---|
| CN | 201477524 | 5/2010 |
| CN | 101976099 | 2/2011 |
| CN | 201741069 U | 2/2011 |
| CN | 102520803 | 6/2012 |
| CN | 202472496 U | 10/2012 |
| CN | 203133676 | 8/2013 |
| CN | 103513715 | 1/2014 |
| CN | 103629493 | 3/2014 |
| TW | 201106128 | 2/2011 |

OTHER PUBLICATIONS

"International Search Report and Written Opinion", Application No. PCT/CN2014/075038, Dec. 30, 2014, 16 pages.

"International Search Report and Written Opinion", Application No. PCT/CN2014/089867, Jun. 26, 2015, 15 pages.

"International Search Report and Written Opinion", Application No. PCT/CN2014/089868, Aug. 3, 2015, 11 pages.

"Non-Final Office Action", U.S. Appl. No. 14/516,294, Oct. 29, 2015, 14 pages.

"Non-Final Office Action", U.S. Appl. No. 14/517,379, Oct. 7, 2015, 16 pages.

"7 Genius Tablet Cover Features", retrieved from http://www.ebay.com/gds/7-Genius-Tablet-Cover-Features-/10000000177629377/g.html on Oct. 29, 2014, Apr. 28, 2014, 6 pages.

"Bluetooth 360 Rotating Removable Keyboard Case Cover Stand for iPad 2 3 4", Retrieved From: <http://www.ebay.com/itm/Bluetooth-360-Rotating-Removable-Keyboard-Case-Cover-Stand-for-iPad-2-3-4-/200999748037> Mar. 31, 2014, Mar. 19, 2014, 3 Pages.

"Flexible Water Resistant Full Size Keyboard USB", Retrieved from <http://www.fentek-ind.com/kbflusbps2b.htm#.VFCJpbUcwnt>, Jan. 26, 2013, 6 pages.

(56) References Cited

OTHER PUBLICATIONS

"Introduction to Windows Touch", Retrieved from: <http://download.microsoft.com/download/a/d/f/adf1347d-08dc-41a4-9084-623b1194d4b2/Win7_touch.docx>, Dec. 18, 2008, pp. 1-7.
"Keyboard Case Adjustable 10inch Rotating Stand Bluetooth USB Apple Ipad 2 3", Retrieved From:<http://shopping.rediff.com/product/keyboard-case-adjustable-10inch-rotating-stand-bluetooth-usb-apple-ipad-2-3/11935954> Mar. 31, 2014, 2 Pages.
"KeyFolio Pro™ for iPad Air", Retrieved From:<http://www.kensington.com/kensington/us/us/s/3478/keyfolio-pro%E2%84%A2-for-ipad-air.aspx#. UxYf5PldV8F> Feb. 26, 2014, Dec. 15, 2013, 2 Pages.
"KeyFolio Thin X2™ for iPad® Air", retrieved from http://www.kensington.com/ce/ca/v/4462/1758/keyfolio-thin-x2™-for-ipad®-air#.VFBuffnLcpo on Oct. 29, 2014, 3 pages.
"Logitech Ultrathin Keyboard Folio for iPad Air", Retrieved From: <http://store.apple.com/us/product/HE900VC/A/logitech-ultrathin-keyboard-folio-for-ipad-air> Mar. 28, 2014, 2013, 4 Pages.
"Meet ClamCase Pro", Retrieved From: <http://calmcase.com/bluetooth-ipad-keyboard-case.html?PID=6146810> Mar. 28, 2014, 6 Pages.
"Purple Swivel Rotating Stand Case Cover Wireless Bluetooth Keyboard for iPad Air", Retrieved From: <http://www.ebay.com/itm/Purple-Swivel-Rotating-Stand-Case-Cover-Wireless-Bluetooth-Keyboard-for-iPad-Air-/400686726944> Mar. 31, 2014, Mar. 2014, 9 Pages.
"QODE Ultimate Keyboard Case for iPad (4th & 3rd gen) and iPad 2", Available at: <http://www.belkin.com/us/p/P-F5L149/>, Mar. 28, 2013, 8 pages.
"SAVFY® Google NEXUS 7 Flip Stand Leather Folio Case Cover Multi-Function Smart Cover with Magnetic Auto Sleep and Wake up Sensor, Free Bonus: Clear Screen Protector + SAVFY Cleaning Cloth for Google Nexus 7 Asus Tablet Android 4.1 Jellybean 8GB / 16GB/32GB", retrieved from http://www.amazon.co.uk/SAVFY® -Google-Leather-Multi-Function-Magnetic/dp/B00F36H4AK on Oct. 29, 2014, 4 pages.
"USRobotics Adds 360° Rotating Folio Case/Stand For the iPad 2 to Tablet Accessory Product Portfolio", retrieved from http://usr-lat.com/press/pr-press-release.asp?loc=mxco&prid=679 on Oct. 29, 2014, Jul. 12, 2011, 2 pages.
"Windows 8 is Gorgeous, But is it More Than Just a Shell? (Video)", retrieved from <http://techcrunch.com/2011/06/02/windows-8-gorgeous-shell-video/> on Jun. 20, 2011, Jun. 2, 2011, 6 pages.
Greenberg, "Review: SHARKK Apple iPad Air Wireless Bluetooth Keyboard Case", Retrieved From: <http://www.runaroundtech.com/2014/01/25/review-sharkk-apple-ipad-air-wireless-bluetooth-keyboard-case/> Mar. 31, 2014, 6 Pages.
Hahn, "FreedomCase, the Adjustable Stand and Proetective Case for Microsoft Surface Tablets with Patent-Pending Folding Design, Launches Pre-Orders on Kickstarter", Retrieved From: <http://www.prweb.com/releases/2014/02/prweb11583725.htm> Mar. 3, 2014, Feb. 8, 2014, 4 Pages.
Kendrick, "Belkin Ultimate Keyboard Case for iPad: It's the magnets (review)", retrieved from http://www.zdnet.com/belkin-ultimate-keyboard-case-for-ipad-its-the-magnets-review-7000013164/ on Oct. 29, 2013, 7 pages.
Sun, "Clamshell Keyboard Case transforms the iPad Mini into a Laptop and Gets Raving Review from RunAroundTech.com", Retrieved From: <http://www.prweb.com/releases/2014/01/prweb11456818.htm> Apr. 1, 2014, Jan. 6, 2014, 3 Pages.
"Final Office Action", U.S. Appl. No. 14/516,294, May 9, 2016, 15 pages.
"Final Office Action", U.S. Appl. No. 14/517,379, May 19, 2016, 18 pages.
"Non-Final Office Action", U.S. Appl. No. 14/516,228, Jun. 2, 2016, 9 pages.
"Non-Final Office Action", U.S. Appl. No. 14/516,294, Jul. 5, 2016, 18 pages.
"Notice of Allowance", U.S. Appl. No. 14/516,228, Jul. 15, 2016, 8 pages.
"Corrected Notice of Allowance", U.S. Appl. No. 14/516,228, Aug. 23, 2016, 2 pages.
"Non-Final Office Action", U.S. Appl. No. 14/424,011, Aug. 26, 2016, 12 pages.
"Non-Final Office Action", U.S. Appl. No. 14/425,547, Sep. 8, 2016, 16 pages.
"Non-Final Office Action", U.S. Appl. No. 14/517,379, Oct. 4, 2016, 11 pages.

* cited by examiner

HINGED COVER FOR COMPUTING DEVICE

PRIORITY APPLICATION

This application claims benefit of priority of PCT Application Serial No. PCT/CN2014/074988 entitled "Hinged Cover for Computing Device" filed Apr. 9, 2014, the content of which is incorporated by reference herein in its entirety.

BACKGROUND

Users have access to an ever increasing variety of functionality in a variety of different settings. For example, users traditionally interacted with desktop computing devices (e.g., desktop PCs) to perform word processing and so forth. Mobile computing devices were then developed and began with use of simple functionality such as text messages and progressed to advanced functionality including feature-rich applications.

However, the form factor of the mobile computing devices used to promote mobility of the device may limit an ability of a user to interact with this functionality in an efficient manner. For example, use of an onscreen keyboard may limit a user to basic inputs and thus even though an application may support rich features the input techniques made available to a user may limit interaction with these features.

SUMMARY

Techniques including use of a hinged cover for a computing device are described. In one or more implementations, an apparatus includes a connection portion, a cover, and a hinge mechanism. The connection portion is configured to support a computing device having a slate form factor. The cover has first and second cover portions that are rotationally secured to each other and the first cover portion is secured to the connection portion. The cover is configured to assume a closed configuration in which that first and second cover portions at least partially cover a display device of the computing device and an open configuration in which the display device is exposed. The hinge mechanism has first and second members that are rotationally secured to each other, the first member is also secured to the first cover portion. The hinge mechanism is configured such that when the cover is in the open configuration the first and second members form a support structure having an angle at a rear of the computing device that opposes a side of the computing device having the display device such that the second member is disposed proximate to the rear of the computing device.

In one or more implementations, an input device includes a connection portion configured to support a computing device having a slate form factor, a cover, and a hinge mechanism. The cover has first and second cover portions that are secured to each other, the first cover portion is secured to the connection portion and includes input functionality configured to initiate one or more operations of the computing device. The cover is configured to assume a closed configuration in which that first and second cover portions at least partially cover a display device of the computing device and an open configuration in which the display device and the input functionality is exposed. The hinge mechanism has first and second members that are rotationally secured to each other, the first member is also secured to the first cover portion. The hinge mechanism is configured such that when the cover is in the open configuration the first and second members form a support structure disposed at a rear of the computing device that opposes a side of the computing device having the display device.

In one or more implementations, a system includes a computing device having a slate form factor and an input device. The input device has a cover configured to assume a closed configuration in which first and second cover portions of the cover at least partially cover a display device of the computing device and an open configuration in which the display device and input functionality usable to initiate one or more operations of the computing device are exposed. The input device also has a hinge mechanism configured such that when the cover is in the open configuration the first and second members form a support structure at a rear of the computing device that opposes a side of the computing device having the display device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

The ways in which a user may interact with a mobile computing device has not followed the increases in functionality of applications made available via mobile computing devices. Accordingly, uses of mobile computing devices such as tablets and mobile phones may have access to advanced functionality such as productivity applications (e.g., word processors, presentations, and spreadsheets) but be limited in the ways in which interaction with this functionality may be performed using conventional techniques.

Techniques involving a hinged cover for a computing device are described. In one or more implementations, an apparatus for a computing device is configured to offer protection for the computing device. This may include use of a cover that is configured to protect a display device of the computing device, such as a computing device formed according to a slate configuration. The cover may also be configured to support the computing device when in an open configuration. The cover, for instance, may include a hinge mechanism having first and second members that form a support structure to position the display device for viewing when in an open configuration.

Further, the cover may include input device functionality such as a keyboard and track pad to support user interaction with the computing device. Thus, the hinge mechanism may be configured to support the computing device and the cover may be configured to protect the display device as well as support inputs for interaction with the computing device. Further discussion of these and other techniques involving a hinged cover may be found in relation to the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
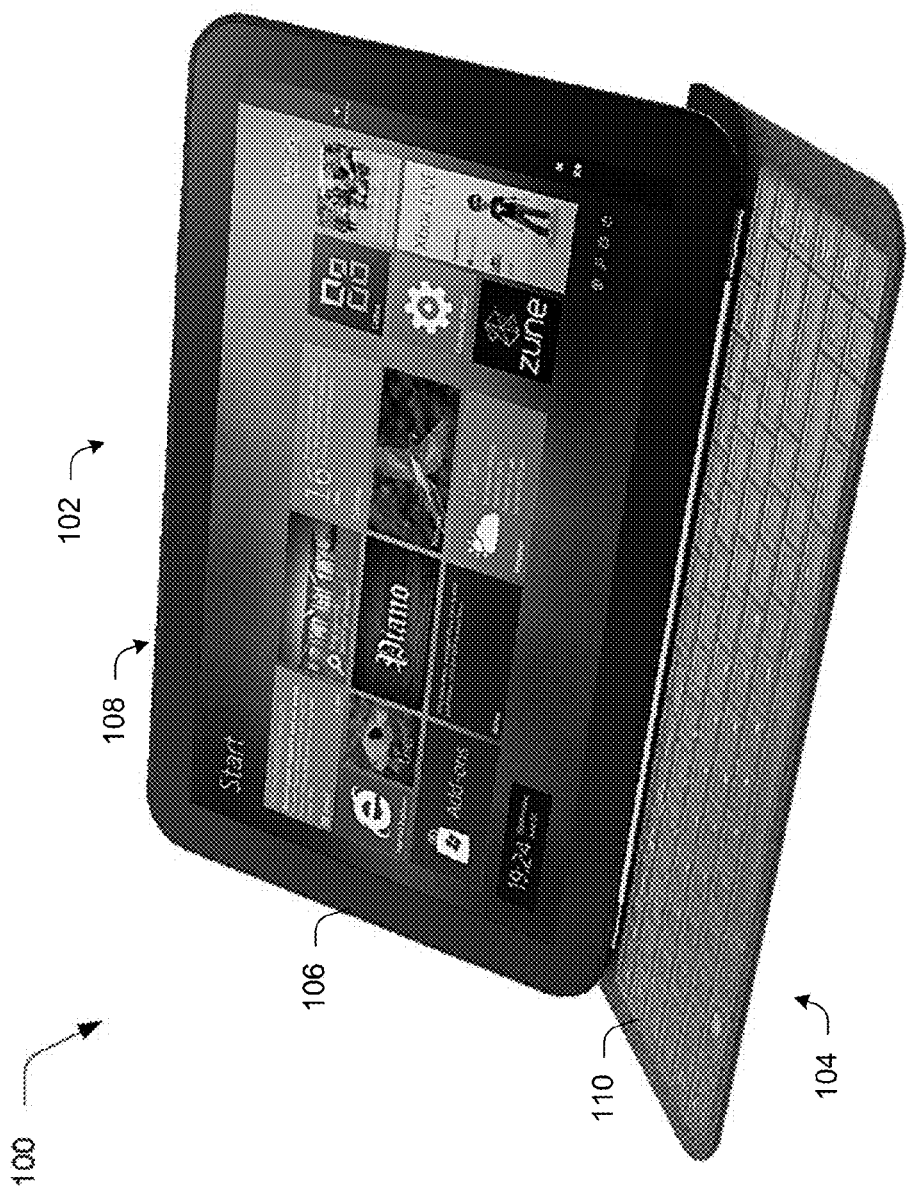
FIG. 1 is an illustration of an environment in an example implementation that is operable to employ the hinged cover computing device techniques.

FIG. 1 is an illustration of an environment 100 in an example implementation that is operable to employ techniques described herein. The illustrated environment 100 includes a computing device 102 and an apparatus 104 that may function as a cover for the computing device 102. The computing device 102 may be configured in a variety of ways.

For example, a computing device may be configured as a mobile computing device having a housing 106 formed according to a slate configuration. The housing 106 is configured to support a display device 108, which may incorporate touchscreen functionality to support user interaction with a user interface displayed on the display device 108, such as a start screen as illustrated. Mobile computing devices may take a variety of different forms in the slate configuration, such as a tablet, mobile phone, portable game device, portable media player, phablet, and so forth. Thus, the computing device 102 may range from full resource devices with substantial memory and processor resources (e.g., tablet computers) to a low-resource device with limited memory and/or processing resources (e.g., traditional portable media players). Further discussion of an example of a computing device 102 may be found in relation to FIG. 9.

The computing device 102 and the apparatus 104 are arranged in an open configuration in the illustrated example that supports interaction with the display device 106 (e.g., to view the device and/or interact with touchscreen functionality). The open configuration also supports interaction with input functionality 110 of the apparatus 104. The input functionality 110 is configured to provide one or more inputs to the computing device 104 to initiate one or more operations of the computing device 104. The input functionality 110 may be configured in a variety of ways to accept inputs from a user, such as a keyboard as illustrated, a track pad, touch pad, functionality configured to detect gestures, a camera, and so on. The inputs may be communicated in a variety of way, such as via a physical communicative coupling, a wireless communicative coupling (e.g., Bluetooth®, Wi-Fi®), and so forth.

Although input functionality has been described, output functionality may also be incorporated by the apparatus 104 to cause outputs as indicated by the computing device 104. Examples of output functionality include supplemental display devices (e.g., an electronic ink display), speakers, lighted indications, and so on. A variety of other functionality may also be incorporated within the apparatus 104, such as a supplemental power source, e.g., battery.

Thus, as illustrated when in the open configuration a user may interact with the computing device 102 directly via the display device 106 and indirectly via the input functionality 110 of the apparatus 104. The apparatus 104 is also configured to support the computing device 102 when in the open configuration, such as support placement of the computing device 102 and apparatus 104 on a surface (e.g., a table, a user's lap) to type on the keyboard and position a surface of the display device 106 at an angle relative to the surface. Further description of the open configuration and support functionality of the apparatus 104 may be found in the following discussion and shown in a corresponding figure.

Figure 2:
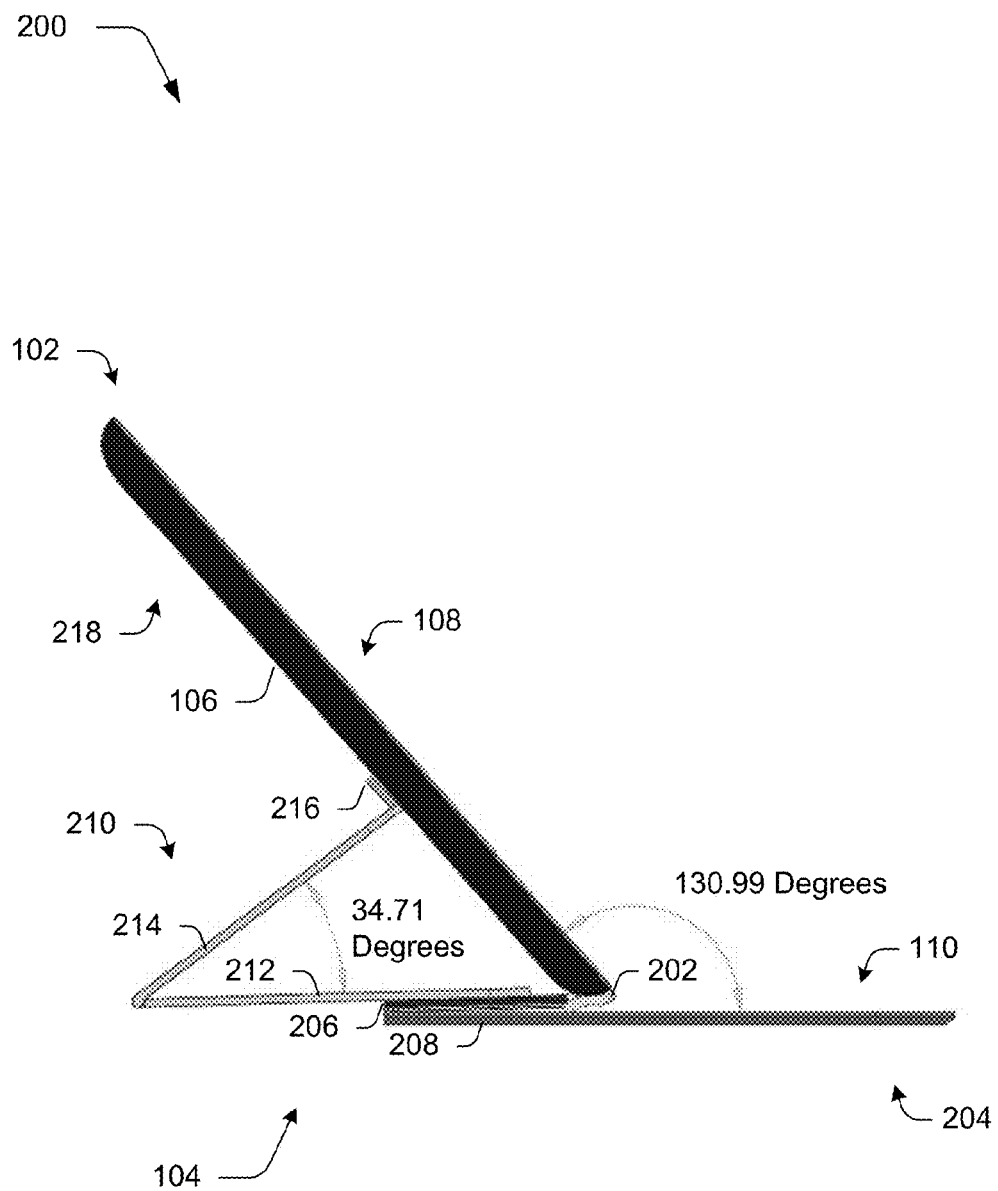
FIG. 2 depicts an example implementation showing a side view of a computing device and apparatus of FIG. 1.

FIG. 2 depicts an example implementation 200 showing a side view of the computing device 102 and apparatus 104 of FIG. 1. The apparatus 204 is illustrated as supporting the housing 106 (and more particularly a bottom side that is generally perpendicular to a surface of the display device 108) using a connection portion 202. The sides of the apparatus 204, for instance, may be disposed between a top surface of the apparatus 104 that includes the display device 108 and a bottom surface that opposes that surface, i.e., a rear of the apparatus 204. The connection portion 202 may support the housing 106 in a variety of ways. For example, the connection portion 202 may be configured to have a complementary shape of the bottom side of the housing, such as to include a raised portion (e.g., a "lip") such that the housing 106 may be placed within the complementary shape.

In another example, the connection portion 202 may support techniques to physically and removably secure the connection portion 202 to the housing 106 of the computing device 102. For example, a mechanical latch may be employed in which a tab is secured within a cavity that is moveable via a sliding button, magnetic attraction may be employed (e.g., one or more magnets may be employed by the computing device 102 and/or apparatus), and so forth. Thus, when secured the combination of the computing device 102 and the apparatus 104 may be moved as a single unit by a user by grasping either one of the computing device 102 or the apparatus 104. Further, the techniques to physically and removably secure the connection portion 202 to the housing 106 may be utilized by a user without the use of tools.

The connection portion 202 may also be configured to support a physical communicative coupling between the apparatus 104 and the computing device 102. For example, the connection portion 202 may include one or more communication contacts that are configured to communicate inputs received from the input functionality 110 to the computing device 108 and vice versa. As previously described, the apparatus 104 may also be configured to support wireless communication techniques.

The connection portion 202 is secured to a cover 204 of the apparatus 104. The cover is configured to be positioned to protect at least a portion of the display device 108 when in a closed configuration and expose the display device 108 when in the open configuration as illustrated. As previously described, the open configuration also causes the input functionality 110 to be exposed and thus the open configuration may support typing in this example although other examples are also contemplated.

The cover 204 includes a first cover portion 206 and a second cover portion 208. The first cover portion 206 is secured to the connection portion, e.g., which may be configured to support rotational movement of the first cover portion 206 in relation to the connection portion 202. The second cover portion 208 is also connected to the first cover portion 206, which may also be configured to support rotational movement of the second cover portion 208 in relation to the first cover portion 206.

The second cover portion 208 includes the input functionality 110 (e.g., the keyboard) that is exposed when in the open configuration. As depicted, an angle formed between a surface of the second cover portion 208 having the input functionality 110 (e.g., a surface of a longitudinal axis of the second cover portion 208) and an outer surface of the display device 108 form an angle that is greater than ninety degrees, e.g., approximately 130.99 degrees in the illustrated example. Thus, in this example a user may readily view the display device 108 and press keys of the keyboard when the computing device 102 and apparatus 104 are placed on a surface.

The apparatus 104 also includes a hinge mechanism 210 that is configured to support the computing device 108 upright when in the open configuration and may be folded flat when in a closed configuration. The hinge mechanism 210 includes a first, second, and optional third members 212, 214, 216. The first member 212 is illustrated as secured to the first cover portion 206 of the cover 204, however other implementations are also contemplated, such as secured to the connection portion 202.

The first and second members 212, 214 are rotationally secured to each other. For example, an axis of rotation of the first and second members 212, 214 may follow an axis of rotation of the first and second cover portions 206, 208 in relation to each other. The first and second members 212, 214 when in the open configuration for a support structure having an angle at a rear 218 of the computing device 102, e.g., a side opposite the display device 108. An angle formed by the first and second members 212, 214 when in this orientation that is less than ninety degrees, approximately 34.71 degrees in the illustrated example.

Thus, the second member 214 may support the rear 218 of the computing device 102 with the angle formed between the computing device 102 and the cover 204 (e.g., greater than ninety degrees) causing the computing device 102 to rest against the second member 214 and/or the third member 216 when placed on a generally horizontal surface.

The third member 216 is secured to the second member 214, e.g., "fixed," as an integral part, rotationally connected, and so on. The third member 216 may be configured such that a surface of the third member 216 "lies flat" or in any appropriate way provides additional support against the rear 218 of the computing device 102 to provide additional support and reduce scratching.

Thus, when in the open configuration as illustrated the first member 212 of the hinge mechanism 210 and the first and second cover portions 206, 208 are disposed along generally parallel planes that are different, one from another. In this way, the first cover portion 206 is supported by the second cover portion 208 when the apparatus 104 is placed on a surface. Likewise, the first member 212 of the hinge mechanism 210 is supported by both the first and second cover portions 206, 208 to form a stacked arrangement. This provides a stable base for the support structure formed by the hinge mechanism 210 for the computing device 102. The apparatus 204 may also be arranged in a closed configuration, with or without the computing device 102, further description of which may be found below and is shown in a corresponding figure. Additional rotation may be provided between cover portions 206 and 208 allowing the connection point between members 212 and 214 to rest on the flat surface supporting cover portion 208 which may create a bit of 'back tilt' to the commuting device 102 and accommodate the slight height difference in the stacked arrangement of cover portion 206 and 208 and member 212.

Figures 3A, 3B:
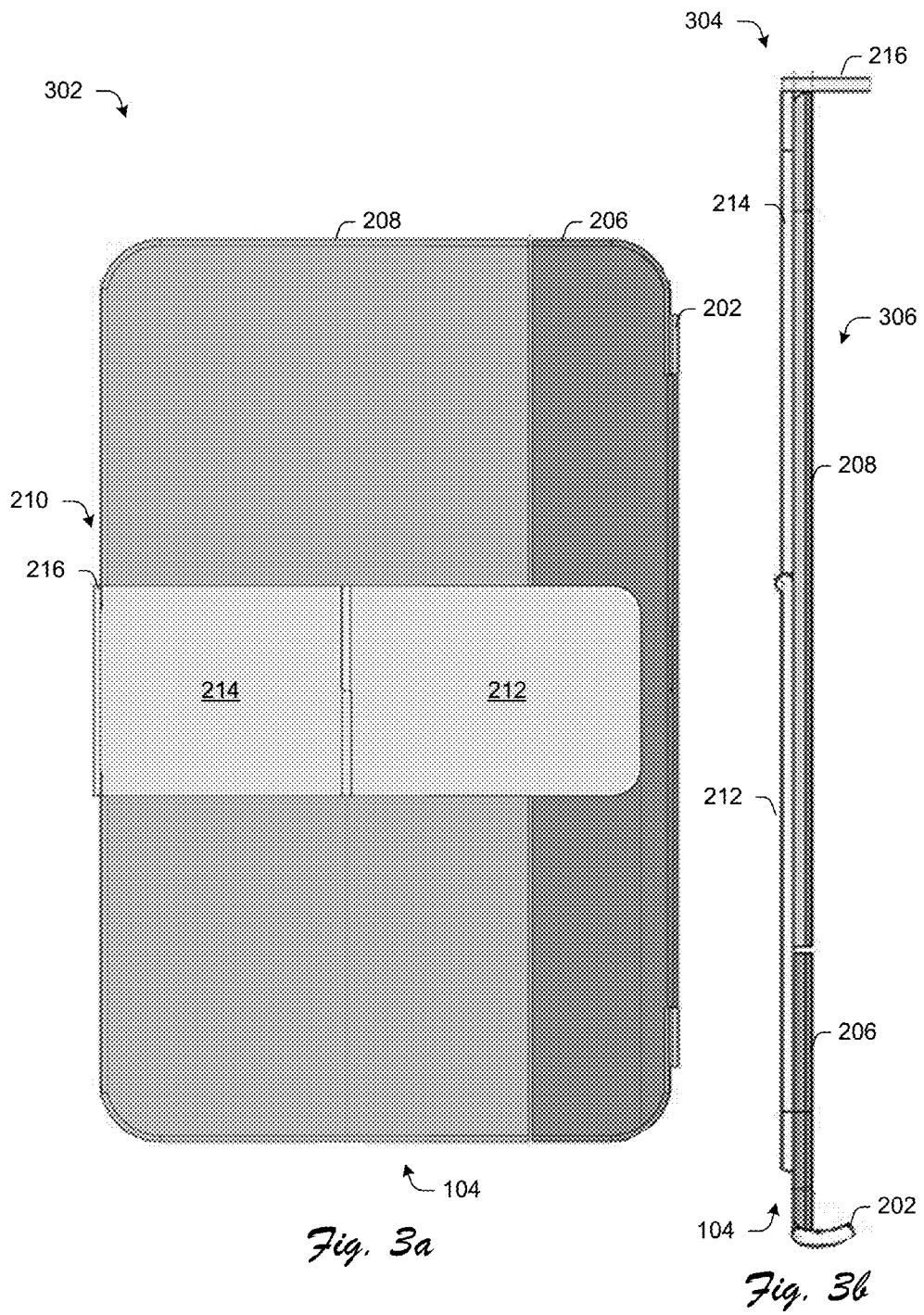
FIG. 3a depicts an example implementation showing a top view of the apparatus as assuming a closed configuration and FIG. 3b. depicts an example implementation showing a side view of the apparatus as assuming a closed configuration.

FIG. 3a depicts an example implementation 302 showing a top view of the apparatus 104 as assuming a closed configuration and FIG. 3b depict an example implementation 304 showing a side view of the apparatus 104 as assuming a closed configuration. As shown in the top and side views 302, 304, the first and second cover portions 206, 208 may be positioned along a single axis (i.e., coplanar) defined by outer longitudinal surfaces of the portions.

Likewise, the first and second members 212, 214 may also be positioned along a single axis (i.e., in a single plane) defined by outer longitudinal surfaces of the members. As illustrated, these axes may be generally parallel to each other such that the first and second members 212, 214 rest against a surface of the first and second cover portions. In this way, the hinge mechanism 210 may be positioned "out of the way" when in the closed configuration.

In the illustrated example, the closed configuration permits ease of transport of the apparatus 104. The closed configuration may also protect the computing device 102 when positioned in an area 306 that is protected by the first and second cover portions 206, 208, such as when the connection portion 202 is secured to a bottom side of the computing device 102 and the third member 216 protects an opposing side of the computing device 102. An example of installation of the apparatus 104 on the computing device 102 is described as follows and shown in a corresponding figure.

Figure 4:
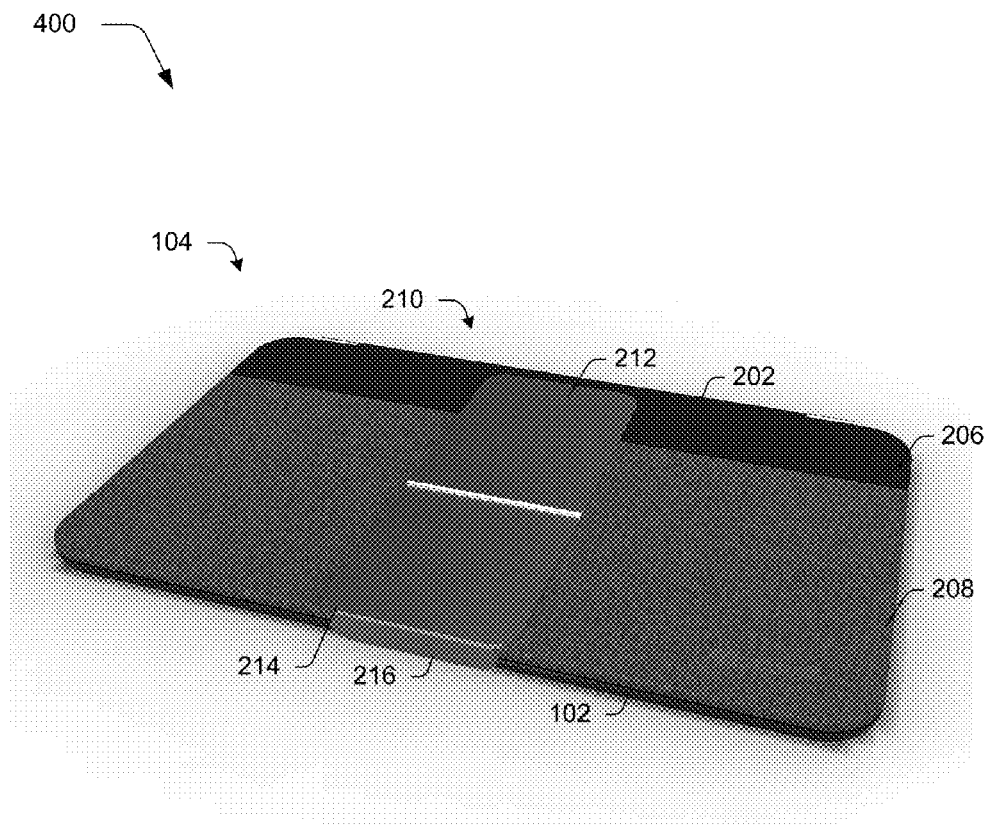
FIG. 4 depicts an example implementation in which the apparatus assumes a closed configuration and is secured to a computing device to protect a display device of the computing device.

FIG. 4 depicts an example implementation 400 in which the apparatus 104 assumes a closed configuration and is secured to a computing device 102 to protect a display device 108. First and second cover portions 206, 208 of the cover 210 at least partially cover the display device 108 thereby protecting the device from damage. The first and second members 212, 214 are disposed flat against the first and second cover portions 206, 208 in a collinear relationship to each other along a single plane and coplanar to the cover portions as previously described in relation to FIG. 3.

The connection portion 202 is secured to the computing device 102 as described in relation to FIG. 1. To transition between the closed configuration of FIGS. 3 and 4 and the open configuration of FIGS. 1 and 2, the first and second members 212, 214 of the hinge mechanism 210 may be rotated to form a support structure and the first and second cover portions 206, 208 may be rotated to expose the display device 108, further discussion of which may be found in the following and shown in a corresponding figure. In some implementations, the third member 216 can provide a finger hold to grasp the hinge mechanism 210 to begin movement and rotation to set the computing device into the open configuration.

Figure 5:
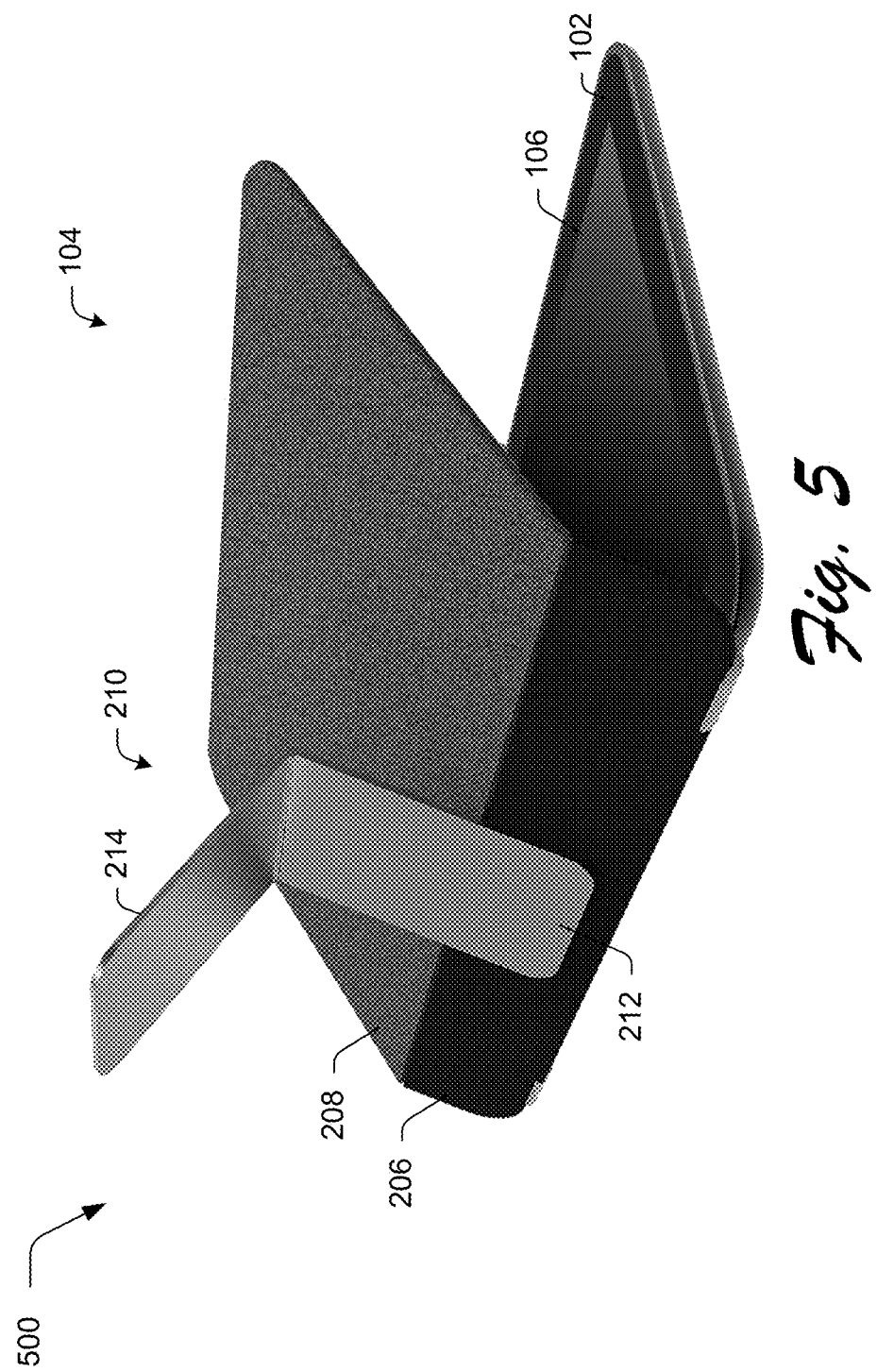
FIG. 5 depicts an example implementation showing a transition between closed and open configurations of the apparatus in relation to the computing device.

FIG. 5 depicts an example implementation 500 showing a transition between closed and open configurations of the apparatus 104 in relation to the computing device 102. In this example, the first and second cover portions 206, 208 are rotated away from the display device 108 of the computing device 102 to expose the display device 108. The first member 212 of the hinge mechanism 210 follows the rotation of the first cover portion 206. As illustrated, the hinge mechanism in this example does not include the third member 216 although that example is also contemplated as previously described.

Additionally, the second member 214 of the hinge mechanism 210 is rotated away from a surface of the second cover portion 208 to form the support structure. Thus, in this example the transition begins with rotation of each of the items of the apparatus in the same direction to assume the open configuration which is described as follows.

Figure 6:
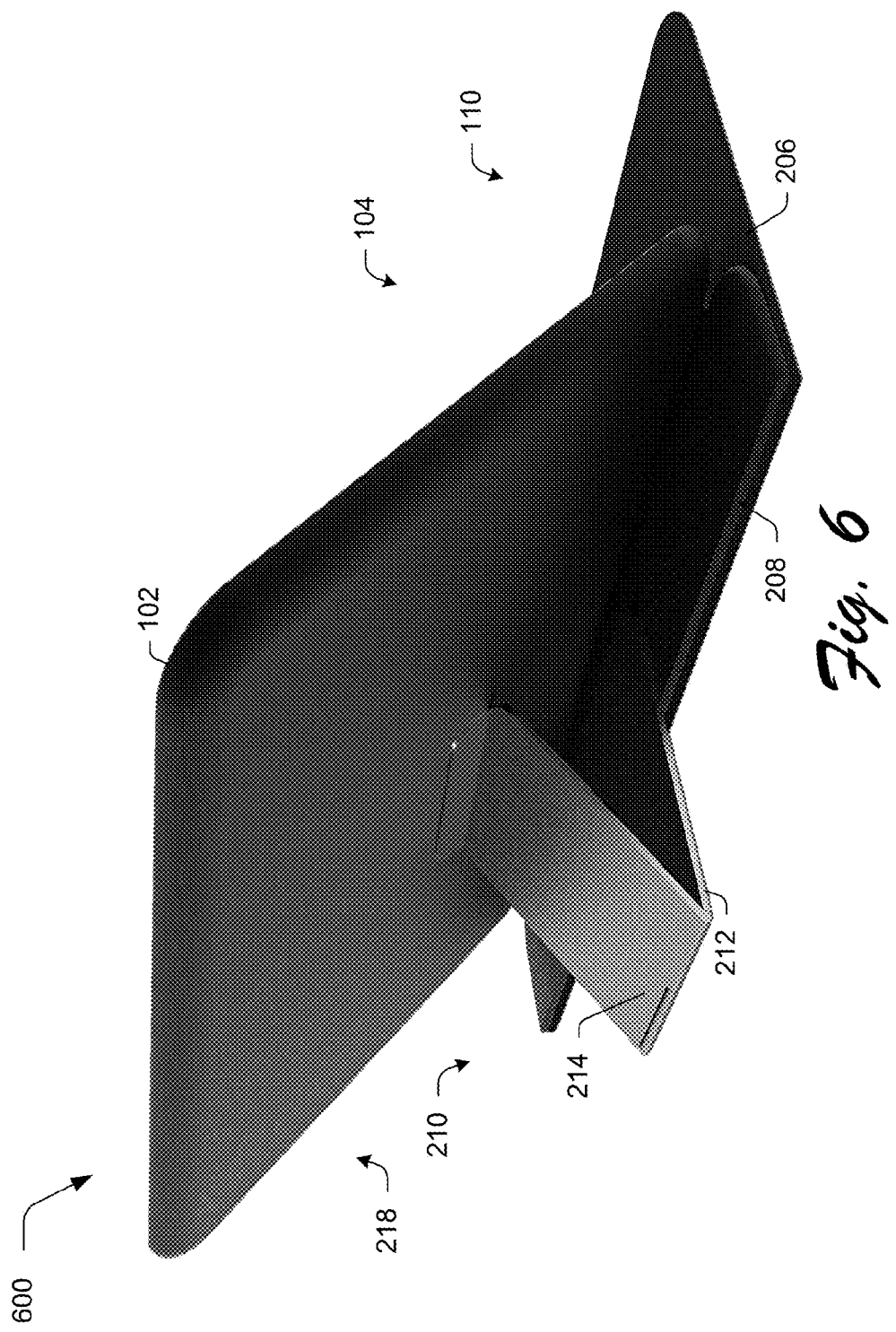
FIG. 6 depicts an example implementation in which a transition described in relation to FIG. 5 is completed to assume an open configuration of the apparatus in relation to the computing device.

FIG. 6 depicts an example implementation 600 in which a transition described in relation to FIG. 5 is completed to assume an open configuration of the apparatus 104 in relation to the computing device 102. As before, the first and second members 212, 214 are angled to form a support structure disposed at a rear 218 of the computing device 102 such that the housing of the computing device 102 rests against the structure.

The first cover portion 208 is also rotated in relation to the second cover portion 206 such that a stacked structure is formed by the first member, the first cover portion 206, and the second cover portion 208. Thus, a surface of the first cover portion 206 that contacted the display device 106 in the closed configuration of FIG. 4 now contacts a surface of the second cover portion 208 that also contacted the display device 106 in the closed configuration of FIG. 4.

This causes the input functionality 110 of the apparatus to be exposed such that a user may provide one or more inputs by pressing keys of the keyboard, interacting with a track pad, and so forth. Also, this stacked arrangement functions to reduce an overall depth the computing device 102 and apparatus 204 when in the open configuration and thus may promote mobility of the system, such as to enable use on a tray in an airplane. It should be readily apparent that the transition described in relation to FIGS. 5 and 6 may also be reversed to transition from the open configuration to a closed configuration.

Figure 7:
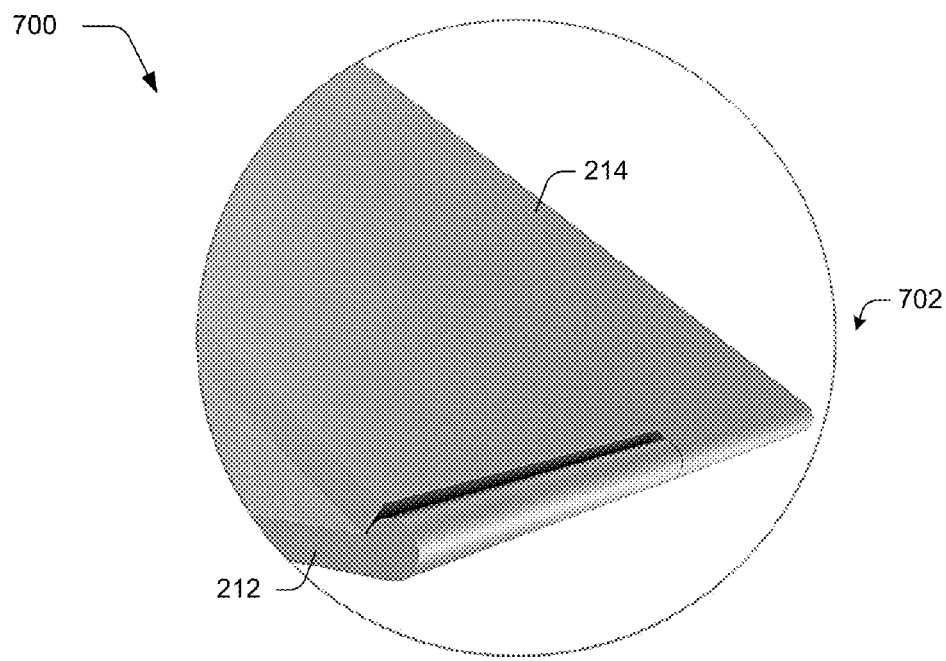
FIGS. 7 and 8 are example implementations showing views of a hinge of the hinge mechanism formed using the first and second members.
Figure 8:
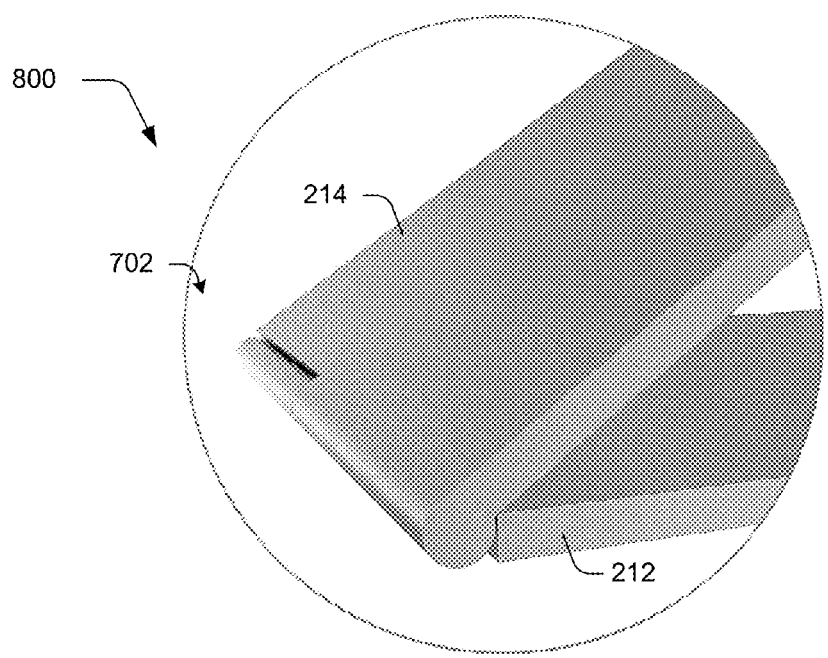

FIGS. 7 and 8 are example implementations 700, 800 showing views of a hinge of the hinge mechanism 210 formed using the first and second members 212, 214. The first and second members 212, 214 support rotational movement through the use of a pin structure 702 about which the first and second members 212, 214 rotate to form a hinge. The hinge is configured such that the first and second members have portions that rest against each other in the open configuration, which may be used to improve stability of the support structure formed by the hinge mechanism 210. A variety of other mechanisms are also contemplated, such as to use a flexible hinge.

Example Computing Device

Figure 9:
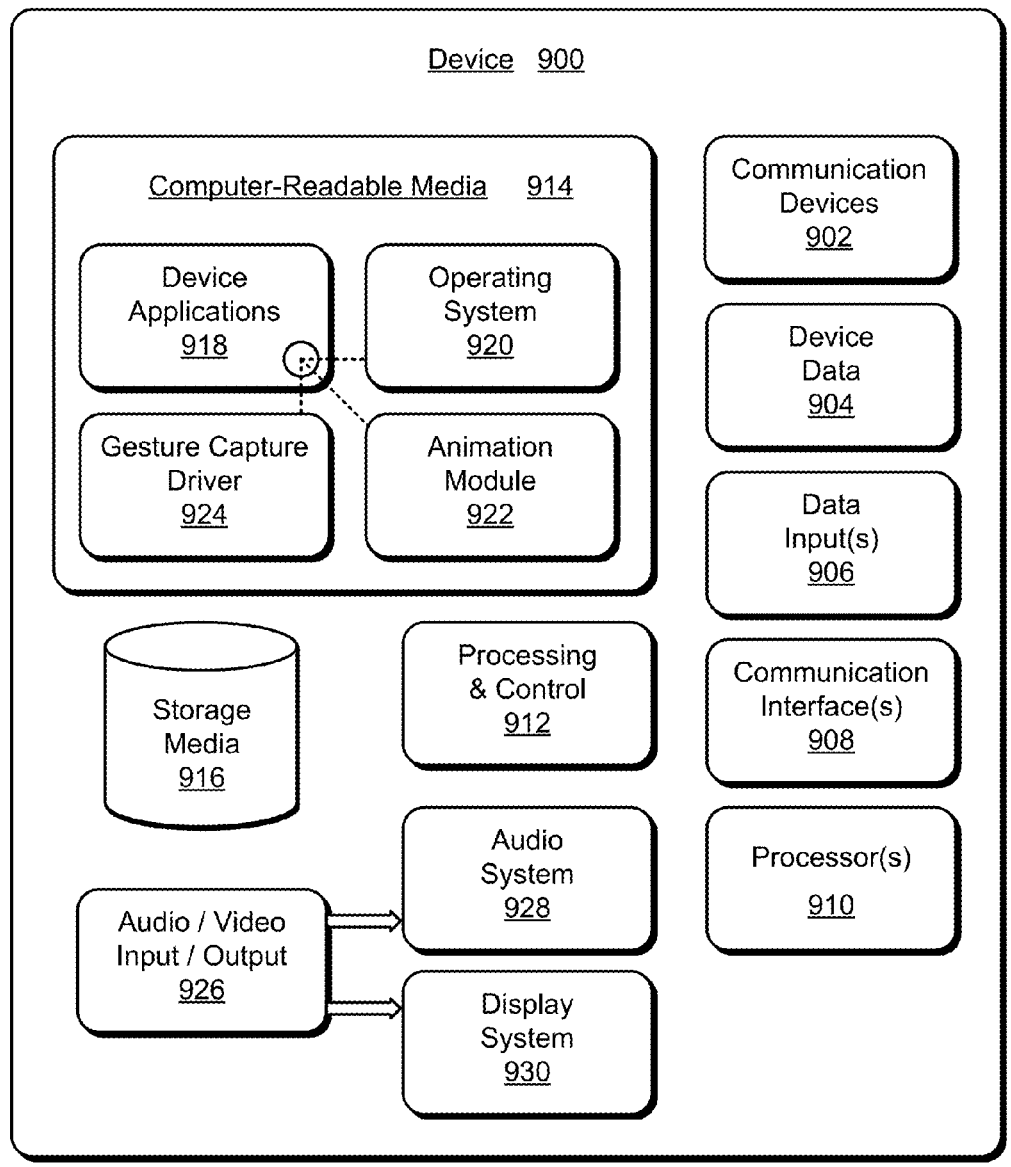
FIG. 9 illustrates an example system including various components of an example device that can be implemented as any type of computing device as described with reference to FIGS. 1-8 to implement embodiments of the techniques described herein.

FIG. 9 illustrates various components of an example device 900 that can be implemented as any type of portable and/or computer device as described with reference to FIGS. 1-8 to implement embodiments of the cover techniques described herein. Device 900 includes communication devices 902 that enable wired and/or wireless communication of device data 904 (e.g., received data, data that is being received, data scheduled for broadcast, data packets of the data, etc.). The device data 904 or other device content can include configuration settings of the device, media content stored on the device, and/or information associated with a user of the device. Media content stored on device 900 can include any type of audio, video, and/or image data. Device 900 includes one or more data inputs 906 via which any type of data, media content, and/or inputs can be received, such as user-selectable inputs, messages, music, television media content, recorded video content, and any other type of audio, video, and/or image data received from any content and/or data source.

Device 900 also includes communication interfaces 908 that can be implemented as any one or more of a serial and/or parallel interface, a wireless interface, any type of network interface, a modem, and as any other type of communication interface. The communication interfaces 908 provide a connection and/or communication links between device 900 and a communication network by which other electronic, computing, and communication devices communicate data with device 900.

Device 900 includes one or more processors 910 (e.g., any of microprocessors, controllers, and the like) which process various computer-executable instructions to control the operation of device 900 and to implement embodiments of a touch pull-in gesture. Alternatively or in addition, device 900 can be implemented with any one or combination of hardware, firmware, or fixed logic circuitry that is implemented in connection with processing and control circuits which are generally identified at 912. Although not shown, device 900 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 900 also includes computer-readable media 914, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 900 can also include a mass storage media device 916.

Computer-readable media 914 provides data storage mechanisms to store the device data 904, as well as various device applications 918 and any other types of information and/or data related to operational aspects of device 900. For example, an operating system 920 can be maintained as a computer application with the computer-readable media 914 and executed on processors 910. The device applications 918 can include a device manager (e.g., a control application, software application, signal processing and control module, code that is native to a particular device, a hardware abstraction layer for a particular device, etc.). The device applications 918 also include any system components or modules to implement embodiments of the gesture techniques described herein. In this example, the device applications 918 include an interface application 922 and an input module 924 (which may be the same or different as input module 114) that are shown as software modules and/or computer applications. The input module 924 is representative of software that is used to provide an interface with a device configured to capture inputs, such as a touchscreen, track pad, camera, and so on. Alternatively or in addition, the interface application 922 and the input module 924 can be implemented as hardware, software, firmware, or any combination thereof. Additionally, the input module 924 may be configured to support multiple input devices, such as separate devices to capture touch and stylus inputs, respectively. For example, the device may be configured to include dual display devices, in which one of the display device is configured to capture touch inputs while the other stylus inputs.

Device 900 also includes an audio and/or video input-output system 926 that provides audio data to an audio system 928 and/or provides video data to a display system 930. The audio system 928 and/or the display system 930 can include any devices that process, display, and/or otherwise render audio, video, and image data. Video signals and audio signals can be communicated from device 900 to an audio device and/or to a display device via an RF (radio frequency) link, S-video link, composite video link, component video link, DVI (digital video interface), analog audio connection, or other similar communication link. In an embodiment, the audio system 928 and/or the display system 930 are implemented as external components to device 900. Alternatively, the audio system 928 and/or the display system 930 are implemented as integrated components of example device 900.

Conclusion

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. An apparatus comprising:
   a connection portion to support a computing device having a slate form factor;
   a cover to assume a closed configuration in which the cover at least partially covers a display device of the computing device and an open configuration in which the display device is exposed; and
   a hinge mechanism, separate from the cover and secured to an outer surface of the cover, having first and second members that are rotationally secured to each other, and when the cover is in the open configuration the first and second members form a support structure having an angle at a rear of the computing device that opposes a side of the computing device having the display device such that the second member is disposed proximate to the rear of the computing device.

2. An apparatus as described in claim 1, wherein the cover includes first and second cover portions that are rotationally secured to each other, the first cover portion is secured to the connection portion, and the first member of the hinge mechanism is secured to the first cover portion.

3. An apparatus as described in claim 1, wherein the connection portion is physically secured to the computing device in a manner that is removable and securable by one or more hands of a user without the use of tools.

4. An apparatus as described in claim 3, wherein the connection portion supports the physical connection through use of magnetism.

5. An apparatus as described in claim 1, wherein in the open configuration is the connection portion and the first cover portion are supported on the second cover portion when placed on a surface.

6. An apparatus as described in claim 1, wherein the open configuration is configured such that the first and second cover portions are disposed along approximately different parallel planes, one to another, defined by outer surfaces of the first and second cover portions.

7. An apparatus as described in claim 1, wherein in the open configuration the first cover portion is disposed between the first member of the hinge mechanism and the second cover portion.

8. An apparatus as described in claim 1, wherein an angle between a surface of the display device and a surface of the second cover portion, when assuming the open configuration, is greater than ninety degrees.

9. An apparatus as described in claim 1, wherein an angle between the first and second members of the hinge mechanism, when assuming the open configuration, is less than ninety degrees.

10. An apparatus as described in claim 1, wherein the second cover portion includes input device functionality that supports user interaction when in the open configuration and is not accessible when in the closed configuration, the input device functionality initiates one or more operations of the computing device.

11. An apparatus as described in claim 1, wherein the hinge mechanism further comprises a third member connected to the second member, the third member causes a surface of the third member to contact the rear of the computing device in a flat manner when in the open configuration to support the computing device.

12. An apparatus as described in claim 11, wherein the third member is rotationally connected to the second member and positioned generally perpendicular to the second member when in the closed configuration.

13. An input device comprising:
    a connection portion to support a computing device having a slate form factor;
    a cover having first and second cover portions that are secured to each other, the first cover portion secured to the connection portion and including input functionality to initiate one or more operations of the computing device, the cover assumes a closed configuration in which the first and second cover portions at least partially cover a display device of the computing device and an open configuration in which the display device and the input functionality is exposed; and
    a hinge mechanism having first and second members that are rotationally secured to each other, the first member is also secured to the first cover portion, and when the cover is in the open configuration the first and second members form a support structure disposed at a rear of the computing device that opposes a side of the computing device having the display device, and when the cover is in the closed configuration the first and second members of the hinge mechanism are positioned substantially flat along a single plane and rest against an outer surface of the cover.

14. An input device as described in claim 13, wherein the input functionality includes a keyboard or a track pad.

15. An input device as described in claim 13, wherein the open configuration involves disposition of the first cover portion between the first member of the hinge mechanism and the second cover portion.

16. A system comprising:
a computing device having a slate form factor; and
an input device including:
- a cover to assume a closed configuration in which first and second cover portions of the cover at least partially cover a display device of the computing device and an open configuration in which the display device and input functionality usable to initiate one or more operations of the computing device are exposed; and
- a hinge mechanism such that when the cover is in the open configuration the first and second members form a support structure, at a rear of the computing device that opposes a side of the computing device having the display device, and when the cover is in the closed configuration the first and second members of the hinge mechanism are positioned substantially flat along a single plane and rest against an outer surface of the cover on the side of the computing device that opposes the display device.

17. A system as described in claim 16, wherein the closed configuration causes the input functionality of the second cover portion to be inaccessible to a user of the computing device.

18. A system as described in claim 16, wherein in the open configuration the first and second cover portions are approximately parallel using different planes defined by outer surfaces of the first and second cover portions.

19. A system as described in claim 16, wherein in the open configuration the first cover portion is disposed between the first member of the hinge mechanism and the second cover portion.

20. A system as described in claim 16, wherein the hinge mechanism further comprises a third member connected to the second member, the third member causing a surface of the third member to contact the rear of the computing device in a flat manner when in the open configuration to support the computing device.

* * * * *